(12) United States Patent
Bartonek (10) Patent No.: US 10,125,878 B2
(45) Date of Patent: Nov. 13, 2018

(54) THERMOSTAT VALVE FOR A COMBUSTION ENGINE

(71) Applicant: ILLINOIS TOOL WORKS INC., Glenview, IL (US)

(72) Inventor: Norbert Bartonek, Hodenhagen (DE)

(73) Assignee: ILLINOIS TOOL WORKS INC., Glenview, IL (US)

(*) Notice: Subject to any disclaimer, the term of this patent is extended or adjusted under 35 U.S.C. 154(b) by 629 days.

(21) Appl. No.: 14/438,238

(22) PCT Filed: Nov. 12, 2013

(86) PCT No.: PCT/US2013/069537
§ 371 (c)(1),
(2) Date: Apr. 24, 2015

(87) PCT Pub. No.: WO2014/078255
PCT Pub. Date: May 22, 2014

(65) Prior Publication Data
US 2015/0286224 A1    Oct. 8, 2015

(30) Foreign Application Priority Data

Nov. 14, 2012  (DE) .................... 10 2012 022 238

(51) Int. Cl.
*F16K 11/08*     (2006.01)
*F16K 11/087*    (2006.01)
(Continued)

(52) U.S. Cl.
CPC .......... *F16K 11/0873* (2013.01); *F16K 11/12* (2013.01); *F16K 11/166* (2013.01)

(58) Field of Classification Search
CPC .. F16K 11/0873; F16K 11/166; F16K 11/163; F16K 11/165; F16K 11/12;
(Continued)

(56) References Cited

U.S. PATENT DOCUMENTS

| 466,433 A | * | 1/1892 | Shortt | ............... | B60T 15/043 |
| | | | | | 137/630.21 |
| 473,486 A | * | 4/1892 | Twiss | ............... | F16K 11/202 |
| | | | | | 137/637.3 |

(Continued)

FOREIGN PATENT DOCUMENTS

| CN | 101535695 A | 9/2009 |
| DE | 102006038213 A1 | 2/2008 |

(Continued)

OTHER PUBLICATIONS

ISR dated Oct. 27, 2014 for PCT/US2013/069537.

*Primary Examiner* — Eric Keasel
(74) *Attorney, Agent, or Firm* — Pilloff & Passino LLP; Martin J. Cosenza (57) ABSTRACT

The invention concerns a thermostat valve for a combustion engine, comprising a housing, which has several cooling fluid connections, and comprising at least one first hollow valve element, which has a spherical or spherical-segment shaped shell surface and is mounted rotatably in the housing, wherein the at least one first valve element comprises several openings limited by the shell surface, which openings can be selectively connected with one or several of the cooling fluid connections of the housing by rotation of the at least one first valve element, wherein at least one second valve element is provided which is rotatable in the housing relative to the at least one first valve element, wherein the at least one second valve element can selectively close or open one or several of the cooling fluid connections of the housing through rotation, and wherein a rotational drive is provided, with which the at least one first valve element and/or the at least one second valve element can be driven rotatably.

15 Claims, 4 Drawing Sheets

(51) Int. Cl.
    *F16K 11/12* (2006.01)
    *F16K 11/16* (2006.01)
(58) Field of Classification Search
    CPC ....... Y10T 137/88022; Y10T 137/8803; Y10T
        137/87129; Y10T 137/86944; Y10T
        137/86984; Y10T 137/86976; Y10T
        137/86863; Y10T 137/87032; Y10T
        137/8704
    USPC ...... 137/614.16, 614.17, 637.3, 630, 630.15,
        137/630.14, 625.46, 630.22, 630.21
    See application file for complete search history.

(56) References Cited

U.S. PATENT DOCUMENTS

| | | | | |
|---|---|---|---|---|
| 541,716 A | * | 6/1895 | Callahan | F16K 39/024 137/630.14 |
| 4,230,154 A | * | 10/1980 | Kalbfleish | F16K 5/10 137/614.17 |
| 4,662,394 A | * | 5/1987 | Williams | F16K 5/0407 137/614.11 |
| 7,963,455 B2 | * | 6/2011 | Heldberg | F16K 11/0873 123/41.08 |
| 8,220,488 B2 | * | 7/2012 | McCully | F16K 5/04 137/614.16 |
| 2009/0114169 A1 | | 5/2009 | Heldberg et al. | |
| 2010/0037838 A1 | | 2/2010 | Moench et al. | |
| 2012/0319028 A1 | | 12/2012 | Kusakabe | |

FOREIGN PATENT DOCUMENTS

| | | |
|---|---|---|
| DE | 102009004157 B3 | 4/2010 |
| EP | 1529937 A1 | 5/2005 |
| EP | 1529937 B1 | 1/2012 |
| WO | 2011135883 A1 | 11/2011 |

* cited by examiner

THERMOSTAT VALVE FOR A COMBUSTION ENGINE

RELATED APPLICATIONS

The present application is a National Phase of International Application Number PCT/US2013/069537 filed Nov. 12, 2013 and claims priority to German Application Number 10 2012 022 238.6, filed Nov. 14, 2012.

The invention concerns a thermostat valve for a combustion engine, comprising a housing, which has several cooling fluid connections, and comprising at least one first hollow valve element, which has a spherical or spherical-segment shaped shell surface and is mounted rotatably in the housing, wherein the at least one first valve element comprises several openings limited by the shell surface, which openings can be selectively connected with one or several of the cooling fluid connections of the housing by rotation of the at least one first valve element.

Such thermostat valves are used to control the coolant circuits of internal combustion engines for motor vehicles. The housing of the thermostat valve can here for example have at least three cooling fluid connections, one of which is connected to the coolant circuit of the internal combustion engine, one to a radiator and one to a bypass to avoid the radiator. The housing can also have a fourth cooling fluid connection which is connected for example to a heating system for the interior of the motor vehicle. With the valve element formed for example as a spherical segment shell, the cooling fluid connections can be connected together in a desired manner. Thus for example during the cold-start phase of the combustion engine, the coolant coming from the engine can be conducted back into the engine coolant circuit via the bypass, avoiding the radiator. In this way, the cold-start phase of the engine is shortened. Correspondingly, the coolant can also be supplied to the motor vehicle heating system after partially or completely reaching operating temperature.

In principle, there is a need for achieving many different switch positions for the coolant fluid connections by means of the valve element as flexibly as possible. For example, during the cold-start phase it may be desirable to stop completely the flow of coolant circulating through the coolant circuit of the internal combustion engine. The combustion engine need then only heat the motionless coolant, and reaches its operating temperature more quickly. The more switch positions to be achieved with for example a spherical-segment shell shaped valve element, the greater the number of different openings which must be provided along the shell surface of the valve element. This enlarges the shell surface and hence the installation space required for the housing and the entire thermostat valve.

Starting from said prior art, the invention is based on the object of providing a thermostat valve of the type cited initially which fulfils a plurality of switch requirements in a flexible manner with a compact construction.

This object is achieved by the invention with the subject of claim 1. Advantageous embodiments are described in the subclaims, the description and the figures.

The invention achieves the object with a thermostat valve for a combustion engine, comprising a housing which has several cooling fluid connections, and comprising at least one first hollow valve element, which has a spherical or spherical-segment shaped shell surface and is mounted rotatably in the housing, wherein the at least one first valve element comprises several openings limited by the shell surface, which openings can be selectively connected with one or several of the cooling fluid connections of the housing by rotation of the at least one first valve element, wherein at least one second valve element is provided which is rotatable in the housing relative to the at least one first valve element, wherein the at least one second valve element can selectively close or open one or several of the cooling fluid connections of the housing through rotation, and wherein a rotational drive is provided, with which the at least one first valve element and/or the at least one second valve element can be driven rotatably.

As already stated initially, the thermostat valve serves to control the coolant circuit of a combustion engine of a motor vehicle. As also explained, the housing can have for example at least three cooling fluid connections, wherein a first of the cooling fluid connections is connected to the coolant circuit of the internal combustion engine, a second of the cooling fluid connections is connected to a radiator pipe to a radiator, and a third of the cooling fluid connections is connected to a bypass pipe avoiding the radiator. It is also possible that the housing has one or more further cooling fluid connections which for example are connected with a heating pipe for an interior heating system of the motor vehicle. The thermostat valve has at least one hollow valve element with a spherical or spherical-segment shaped shell surface which is mounted rotatably in the housing and can be rotated in the housing by means of a rotational drive. The at least one first valve element has several openings limited by its shell surface, which openings can be selectively connected with one or several of the cooling fluid connections of the housing by rotation of the at least one first valve element, in order to control the coolant circuit. The coolant circuit can be controlled temperature-dependently.

For this, a temperature sensor can be provided which registers the temperature of the coolant coming from the combustion engine and controls the rotational drive as a function thereof. It is also possible to achieve an automatic control of the rotational drive of the valve element, for example by means of an expansion element.

According to the invention, at least one second rotatable valve element is arranged in the housing. The at least one second valve element can also have a spherical or spherical-segment shaped outer surface. Also several such second valve elements can be provided. The at least one first and the at least one second valve element can be formed spherical shell shaped or spherical-segment shell shaped.

It is possible in particular that only one of the at least one first and the at least one second valve element is driven rotationally. It is however also possible that both the at least one first and also the at least one second valve element are driven rotationally. Insofar as only one of the valve elements is driven rotationally, i.e. the at least one first valve element or the at least one second valve element, during its driven rotational movement it can also carry the other valve element, i.e. the at least one second valve element or the at least one second valve element, in particular with a delay after covering particular rotary angles, and thus position it precisely. Insofar as several first or second valve elements are provided, these can also be carried by the other valve element(s) in the same manner.

The embodiment according to the invention with at least two valve elements allows a more flexible distribution of the cooling fluid connections to be switched on the thermostat valve. Thus, with a compact housing, a greater number of different switching states can be achieved than with a conventional thermostat valve. As explained initially, in the latter case all switching states must be provided on the shell surface in succession in the direction of rotation of the valve element. With conventional thermostat valves, the positioning is always dependent on the rotary angle according to switching requirement. Therefore all switching states must be provided on the shell surface of conventional valve elements. This enlarges the shell surface and hence the necessary construction space of the valve element and hence also the housing. By the provision of two valve elements according to the invention which are rotatable relative to each other at least over a specific rotary angle region, more switching states can be achieved with smaller construction space.

It is also possible to achieve a fail-safe switching in that, e.g. on failure of the rotational drive, for example the at least one second valve element or for example a further second valve element is moved automatically, e.g. by spring bias or driven by an expansion element, into a fail-safe position in which the circulation of coolant through the combustion engine via the radiator or a bypass is ensured. In this way catastrophic overheating of the combustion engine, for example on stoppage of the coolant circuit of the combustion engine and failure of the rotational drive, can be prevented.

In particular it is possible that, in a position of the at least one second valve element which closes the cooling fluid connections of the housing, two different cooling fluid connections of the housing can be selectively connected with one another or separated from one another by rotation of the at least one first valve element. The housing then has at least three cooling fluid connections. The cooling fluid connection closed by the at least one second valve element can e.g. be connected with the coolant circuit of the internal combustion engine. In this way the coolant circuit can be shut down completely, in particular in the cold-start phase of the combustion engine, so that the combustion engine reaches its operating temperature more quickly. This is advantageous in particular in diesel engines which warm up comparatively slowly.

Furthermore holding means can be provided, which exert a holding force holding the at least one second valve element and/or the at least one first valve element in a predefined rotational position, wherein the at least one second valve element and/or the at least one first valve element can be rotated out of the predefined rotational position against the holding force of the holding means through a rotational movement of the respective other of at least one first valve element and/or at least one second valve element. In this embodiment in particular only one of the at least two valve elements is driven. The at least one other valve element in contrast is carried indirectly by the rotational movement of the at least one rotationally driven valve element, in a defined manner, sometimes with a delay. The holding means can hold the non-driven valve element e.g. in a position closing a cooling fluid connection. The at least one driven valve element then carries the at least one other valve element on its rotational movement, and pushes or pulls it out of its predefined rotational position.

In one embodiment, the holding means can comprise spring bias means, which exert the holding force for holding the at least one second valve element and/or the at least one first valve element in the predefined rotational position. The spring bias can pretension the second valve element e.g. against a stop, e.g. in the shell surface of the first valve element. It is then carried by the driven valve element against the bias. Therefore a delay in carrying the valve element occurs only in one direction.

In a further embodiment it can be provided that the holding means comprise sealing means which are provided in the area of at least one cooling fluid connection of the housing closable by the at least one second valve element and/or the at least one first valve element, wherein the sealing means, when the at least one second valve element and/or the at least one first valve element closes this cooling fluid connection, exerts a contact force onto an outer surface of the at least one second valve element and/or the at least one first valve element such that the at least one second valve element and/or the at least one first valve element is held in the predefined rotational position until it is moved out of contact with the sealing means through a rotational movement of the respective other of at least one first valve element and/or at least one second valve element.

It can furthermore be provided that the sealing means comprise at least one slide ring adapted to the shell surface of the at least one first valve element and/or the outer surface of the at least one second valve element, and at least one elastic sealing ring which biases the slide ring against the shell surface of the at least one first valve element and/or against the outer surface of the at least one second valve element.

The slide ring can for example consist of a solid plastic such as PTFE (trade name Teflon). The elastic sealing ring can be an elastomer sealing ring, for example made from EPDM. The sealing ring rests on a suitable support surface of a sealing seat. In principle such sealing means can be arranged in the region of at least one or all of the cooling fluid connections of the housing which can be closed by the valve elements. Such sealing arrangements are distinguished by great compactness with simple structure.

In a further embodiment it can be provided that the at least one first valve element and the at least one second valve element are connected with one another by connecting means, preferably a slotted-guide connection, such that the at least one first valve element and/or the at least one second valve element during its rotational movement also rotates the at least one second valve element and/or the at least one first valve element. In this embodiment also, only one of the valve elements is driven. The other valve element is in contrast carried in rotation indirectly by the rotational movement of the driven valve element in a defined manner, sometimes with delay.

According to a particularly practical embodiment, the rotational axes of the at least one first valve element and the at least one second valve element can run co-axially. In particular the at least one first valve element and the at least one second valve element can be arranged on the same rotational shaft.

The at least one second valve element can furthermore be rotatable between two stops in one of the openings limited by the shell surface of the at least one first valve element. At least one outer surface of the at least one second valve element can form a variable portion of the shell surface of the at least one first valve element. The spherical valve element is thus formed in segments, in particular is divided into several segments which are movable relative to each other. Thus the second valve element forms a valve segment which is rotatable within a first opening of the first valve element, and hence with its outer surface forms a variable portion of the shell surface of the first valve element. The stops for the second valve element can e.g. be formed by opposing edges of a corresponding opening in the shell surface of the first valve element, in which the second valve element is arranged rotatably. It then makes contact against the stops with the associated edges of its spherical segment-shaped outer surface.

In a further embodiment it can be provided that the at least one second valve element can also be a hollow valve element which has a spherical or a spherical-segment shaped outer surface, wherein the at least one second valve element comprises at least one opening limited by the outer surface, which opening can be selectively connected with at least one of the cooling fluid connections of the housing by rotation of the at least one second valve element. It can also be provided that the at least one second valve element is arranged rotatably mounted in the housing beside the at least one first valve element, wherein the at least one first and the at least one second valve element each have an axial opening on their sides facing towards each other, wherein the axial openings communicate with one another. Thus two spherical segment shaped valve elements are provided which can lie next to each other and are preferably mounted rotatably on a coaxial, in particular the same shaft. Coolant can flow between the valve elements via axial openings, i.e. in particular between cooling fluid connections which can be selectively opened or closed by the first and second valve element. Thus the axes of at least two of the cooling fluid connections of the housing of the thermostat valve, viewed in the axial direction of the rotary axes of the at least one first valve element and at least one second valve element, lie in parallel planes spaced apart each other.

The rotational drive can comprise a vacuum drive or an electric drive. It is however also possible that the rotational drive comprises an expansion element which rotates the valve element temperature-dependently.

The invention also concerns an internal combustion engine of a motor vehicle comprising a thermostat valve according to the invention.

Exemplary embodiments of the invention are explained below in more detail with reference to figures. The drawings show diagrammatically.

Figure 1:
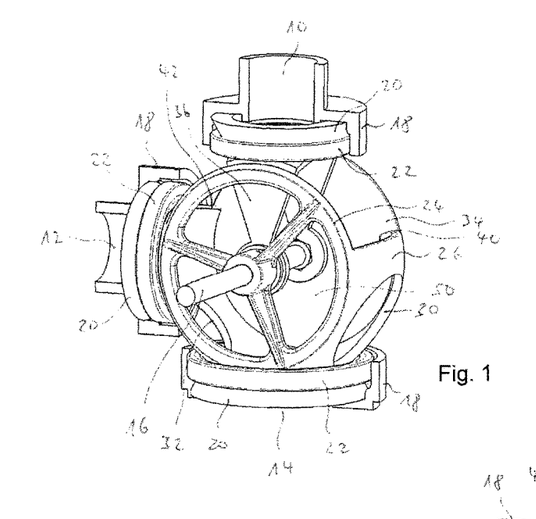
FIG. 1 a perspective and partly cut view of part of the thermostat valve according to the invention according to a first exemplary embodiment in a first operating position, FIG. 2 the view from FIG. 1 in a second operating position, FIG. 3 the view from FIG. 1 in a third operating position, FIG. 4 a cross-section view of a part of a thermostat valve according to the invention in a further exemplary embodiment, FIG. 5 a cross-section view of a part of the thermostat valve shown in FIGS. 1 to 3, FIG. 6 a further perspective and partly cut view of a part of the thermostat valve shown in FIGS. 1 to 3, FIG. 7 a perspective and partly cut view of a part of a thermostat valve according to the invention according to a further exemplary embodiment in a first operating position, FIG. 8 a cross-section view of the thermostat valve from FIG. 7, FIG. 9 the view from FIG. 7 in a second operating position, FIG. 10 a cross-section view of the thermostat valve from FIG. 9, FIG. 11 the view from FIG. 7 in a third operating position, and FIG. 12 a cross-section view of the thermostat valve from FIG. 11.
Figure 2:
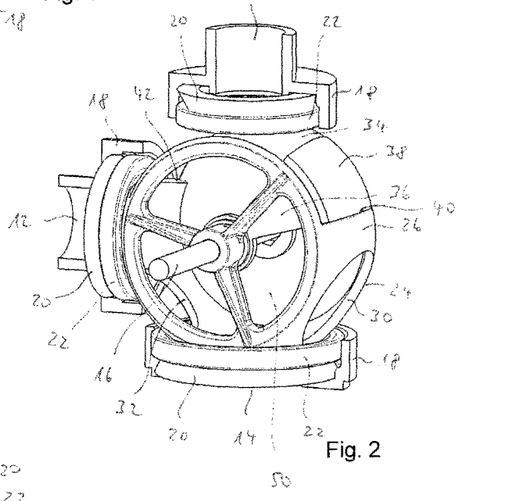
Figure 3:
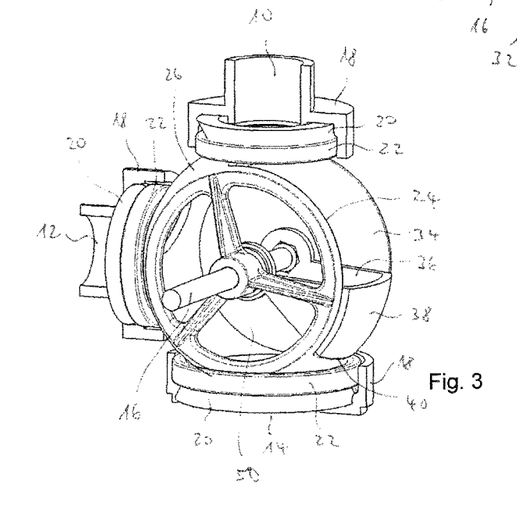

Unless specified otherwise, in the figures the same reference numerals designate the same objects. In FIGS. 1 to 3, a thermostat valve according to the invention is shown in a first exemplary embodiment in a partly cut away, perspective view. For clarification, a housing of the thermostat valve is substantially not shown. Merely the cooling fluid connections of the housing are evident at reference numerals 10, 12, 14. The upper cooling fluid connection 10 in FIGS. 1 to 3 can for example lead to a circuit for an interior heating system of a motor vehicle fitted with a thermostat valve. The lower cooling fluid connection 14 in FIGS. 1 to 3 can be connected to the radiator, and the left cooling fluid connection 12 in FIGS. 1 to 3 can be connected to a bypass pipe to avoid the radiator. In addition, the housing of the thermostat valve, not shown in FIGS. 1 to 3, has a fourth cooling fluid connection which runs in the axial direction of the rotary shaft 16 shown in FIGS. 1 to 3. In particular the cooling fluid connections 10, 12, 14 shown in FIGS. 1 to 3 each have a sealing seat 18. An elastomer sealing ring 20 is arranged in the sealing seat 18 and pretensions a slide ring 22 against a first valve element 24, hollow in the example shown, with a spherical-segment shaped shell surface 26. The first valve element 24 is arranged rotatably on the rotary shaft 16. The shell surface 26 in the example shown has three openings 30, 32, 34. Whereas the openings 30 and 32 are each circular, opening 34 runs completely over the shell surface 16 over a predefined rotary angular region.

A second valve element designated in FIGS. 1 to 3 with reference numeral 36 is also arranged rotatably on the rotary shaft 16. The second valve element 36 is rotatable in the opening 34 between two stops which are defined by the two opposing transverse edges 40, 42 of the opening 34. The second valve element 36 with its spherical segment shaped outer surface 38 forms a variable part of the shell surface 26 of the first valve element 24.

Figures 4, 5, 6:
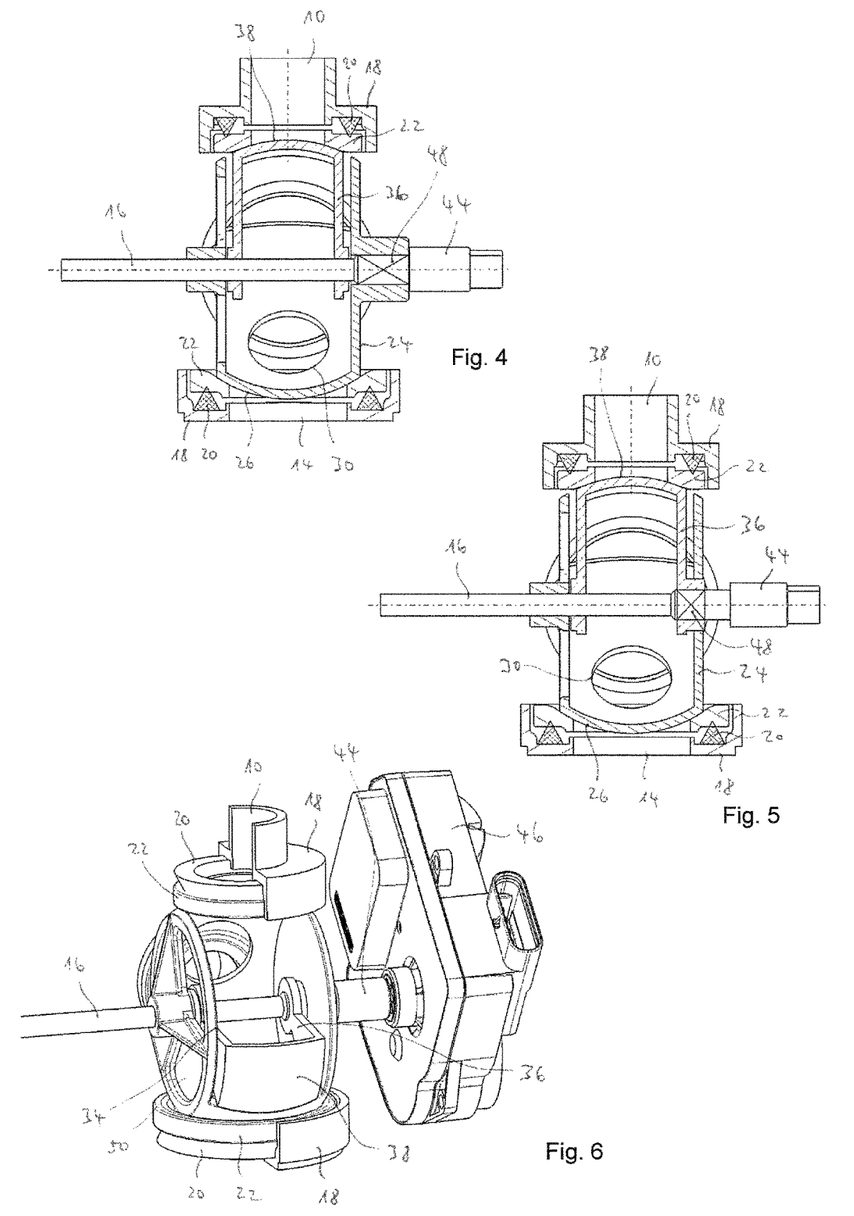

In the example shown in FIGS. 1 to 3, the second valve element 36 is driven by means of a rotational drive. This is shown as an example in FIGS. 5 and 6. In FIG. 5, reference numeral 44 designates a drive shaft, connected for example in FIG. 6 with an electric drive 46. The drive shaft 44 engages by force fit, at reference numeral 48 in FIG. 5, in a suitable recess of the second valve element 36. In this way the second valve element 36 can be driven rotationally by means of the rotational drive 46. The first valve element 24 in this exemplary embodiment is not driven actively by the rotational drive but by a rotational movement of the second valve element 36, as will be explained below. It is however pointed out that for example the first valve element 24 can also be driven rotationally, wherein then the second valve element 36 is not driven actively by the rotational drive but by the rotational movement of the first valve element 24. This is shown as an example in FIG. 4, where the drive shaft 44 engages by force fit at reference numeral 48 in a suitable recess of the first valve element 24.

The function of the thermostat valve according to the first exemplary embodiment will now be explained with reference to FIGS. 1 to 3. In the operating position shown in FIG. 1, the second valve element 36 with its outer surface 38 closes the cooling fluid connection 10 leading to the heating system of the motor vehicle. At the same time, the shell surface 26 of the first valve element 24 also closes the further cooling fluid connections 12 and 14, so that also the cooling fluid connection entering the valve element 24 axially, to the coolant circuit of the combustion engine, is shut off. From this first operating position, the second valve element 36 can be turned by a rotation clockwise in FIG. 1 until with its outer surface 38 it meets the edge 40, forming the first stop of the opening 34 of the first valve element 24, as shown in FIG. 2. If the second valve element 36 is now turned further clockwise, it carries with it the first valve element 24 and also turns this, for example as far as the operating position shown in FIG. 3, in which the circular opening 30 of the first valve element 24 is aligned with the cooling fluid connection 14 leading to the radiator. The connection to the bypass 12 can be closed in this position. This corresponds to the position of the thermostat valve after reaching the operating temperature through the internal combustion engine. Heated coolant, flowing from the coolant circuit of the combustion engine axially into the first valve element 24, is conducted firstly via the cooling fluid connections 10 and 14 via the radiator and back to the coolant circuit of the combustion engine, and secondly into the circuit for the interior heating of the motor vehicle. By subsequently turning back the second valve element 36, after reaching the opposite edge 42 of the opening 34 forming the second stop, the first valve element 24 can again be turned back, for example into the position shown in FIG. 1. Then the second valve element 36 can be turned clockwise into the position shown in FIG. 1 until it closes the cooling fluid connection 10.

FIGS. 7 to 12 show a second exemplary embodiment of a thermostat valve according to the invention. Here for reasons of clarity, only two or three cooling fluid connections of the housing, with corresponding sealing arrangements, are shown. The thermostat valve in FIGS. 7 to 12 has a first valve element 24 which can be constructed identically to the first valve element 24 shown in FIGS. 1 to 6. In contrast to the exemplary embodiment in FIGS. 1 to 6, the thermostat valve according to FIGS. 7 to 12 however has a second valve element 24' which can be constructed largely identical to the first valve element 24. It can have a correspondingly large opening 34' extending completely over its spherical-segment shaped outer surface 26' over a certain rotary angle region. In addition for example it can have a further opening 30', circular in the example shown, in its outer surface 26'. It is possible that it has no further openings in its outer surface 26' other than these two openings 30', 34'. In addition the second valve element 24', like the first valve element 24, has an axial opening 50' interrupted for example by three spokes. The corresponding axial opening, formed identically to this extent, of the first valve element 24 is shown by reference numeral 50. The two valve elements 24, 24' are mounted rotatably on the same drive shaft 16 such that their axial openings 50, 50' are facing each other. In the example shown, the second valve element 24' can open or close a cooling fluid connection 11, shown at the top in FIGS. 7, 9 and 11, depending on its rotary position. This cooling fluid connection 11 can for example be connected with the coolant circuit of the combustion engine.

Figures 7, 8, 9:
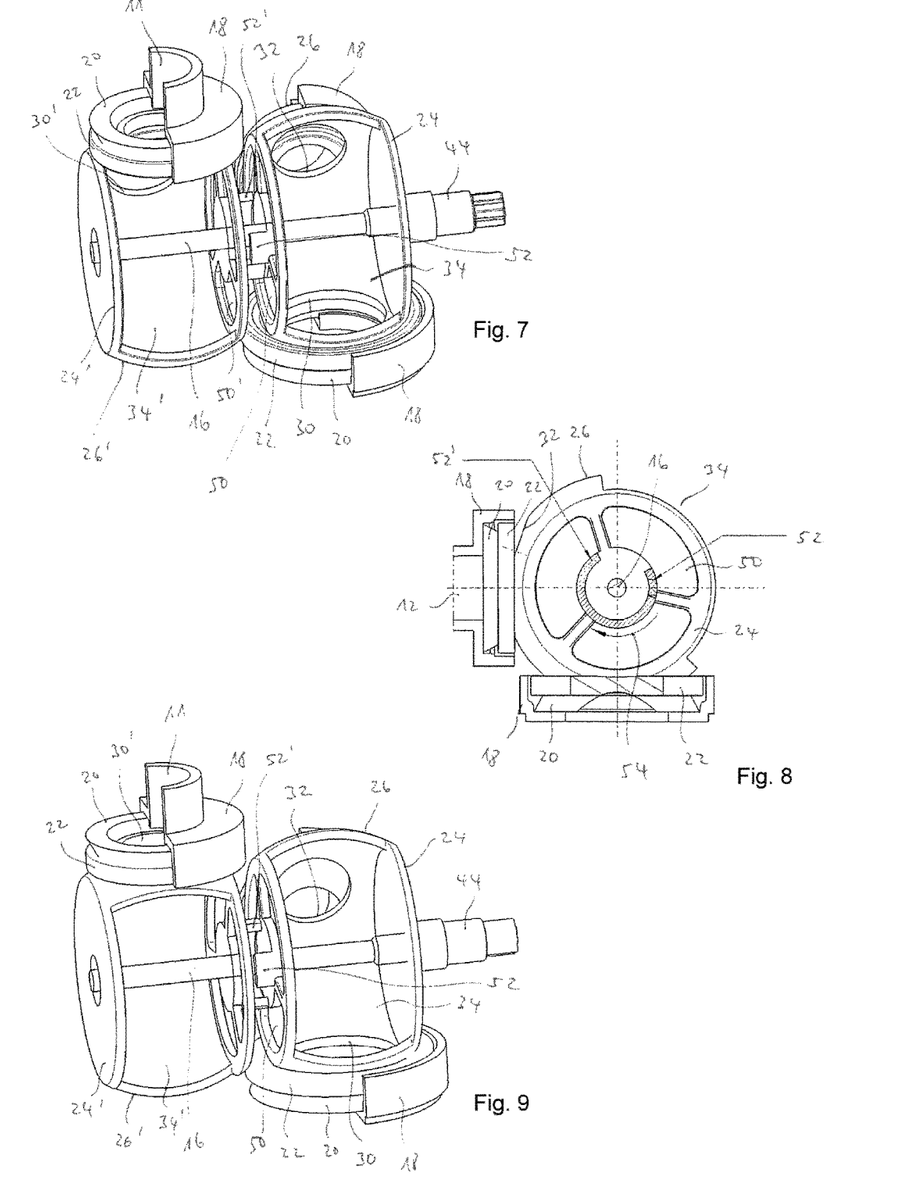
Figure 10:
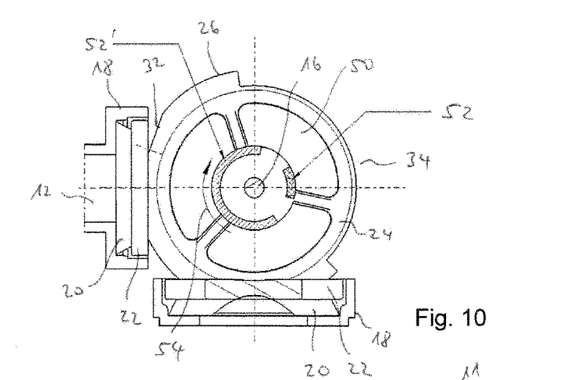
Figure 11:
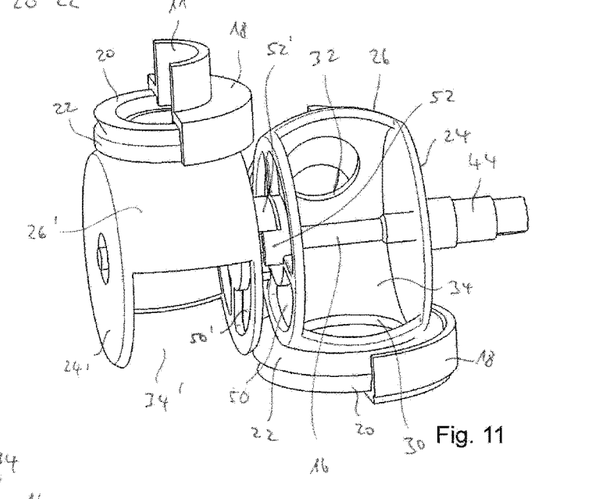
Figure 12:
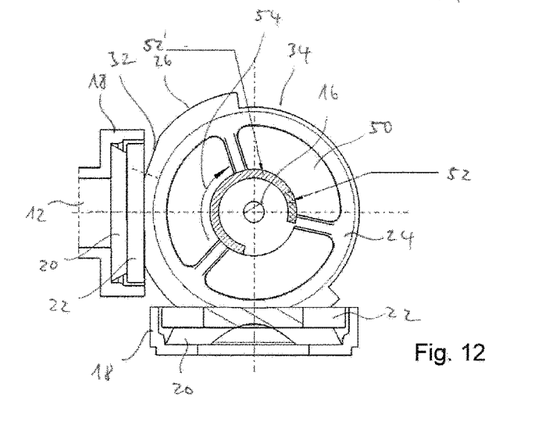

The two valve elements 24, 24' are connected together via a slotted-guide connection in the example shown. For example the second valve element 24' is driven rotationally by means of the drive shaft 44 and the rotational drive (not shown). The slotted-guide connection comprises firstly a protrusion 52 running in portions along a circular track over a comparatively small angular region and formed on the first valve element 24. The slotted-guide connection also comprises a protrusion 52', also running in portions along the circular track and over a comparatively large angular region and formed on the second valve element 24'. In FIGS. 8, 10, 12, these protrusions 52, 52' are indicated by arrows. These FIGS. 8, 10, 12 also clearly show that the protrusions 52, 52' together cover an angular region of less than 360°, i.e. the valve elements 24, 24' are rotatable relative to each other.

If now, for example from the operating state shown in FIGS. 7 and 8, the second valve element 24' is turned clockwise as illustrated by the arrow 54, first only the second valve element 24' turns until the protrusion 52' engages with the protrusion 52 and hence causes a rotary movement of the first valve element 24. FIGS. 9 and 10 in this respect show an intermediate position before engagement of the protrusions 52' and 52. Engagement takes place only on further rotation of the second valve element 24' into the operating state shown in FIGS. 11 and 12. In this position, the opening 30' of the second valve element 24' lies below the slide ring 22. If from the operating state shown in FIGS. 11 and 12, the second valve element 24' is turned further clockwise according to arrow 54, the second valve element 24' on its rotational movement carries the first valve element 24 and also turns this. For example coolant flowing into the second valve element 24' via the cooling fluid connection 11 then passes through the axial openings 50', 50 into the first valve element 24 and can there flow into the respective switched cooling fluid connections, i.e. those opened by openings 30, 32, 34 of the first valve element 24.

The exemplary embodiments of the invention flexibly allow a plurality of different switching states of the thermostat valve with a compact construction of the valve elements and hence of the housing, and thus in turn of the thermostat valve itself.

The invention claimed is:

1. Thermostat valve for a combustion engine, comprising a housing, which comprises several cooling fluid connections and comprising at least one first hollow valve element, which has a spherical or spherical-segment shaped shell surface and is mounted rotatably in the housing, wherein the at least one first valve element comprises several openings limited by the shell surface, which openings can be selectively connected with one or several of the cooling fluid connections of the housing by rotation of the at least one first valve element, wherein at least one second valve element is provided which is rotatable in the housing relative to the at least one first valve element, wherein the at least one second valve element can selectively close or open one or several of the cooling fluid connections of the housing through rotation, and wherein a rotational drive is provided, with which the at least one first valve element and/or the at least one second valve element can be driven rotatably, and wherein in a position of the at least one second valve element closing a cooling fluid connection of the housing, two different cooling fluid connections of the housing can be selectively connected with one another or separated from one another by rotation of the at least one first valve element.

2. Thermostat valve according to claim 1, wherein the at least one first valve element and the at least one second valve element are connected with one another by connecting means, such that the at least one first valve element and/or the at least one second valve element during its rotational movement also rotate the at least one second valve element and/or the at least one first valve element.

3. Thermostat valve according to claim 1, wherein the rotational axes of the at least one first valve element and the at least one second valve element run coaxially.

4. Thermostat valve according to claim 1, wherein the at least one first valve element and the at least one second valve element are provided on the same rotational shaft.

5. Thermostat valve according to claim 1, wherein the rotational drive comprises a vacuum drive or an electrical drive.

6. Thermostat valve according to claim 1, wherein the at least one first valve element and the at least one second valve element are connected with one another by connecting means corresponding to a slotted-guide connection, such that the at least one first valve element and/or the at least one second valve element during its rotational movement also rotate the at least one second valve element and/or the at least one first valve element.

7. Thermostat valve for a combustion engine, comprising a housing, which comprises several cooling fluid connections and comprising at least one first hollow valve element, which has a spherical or spherical-segment shaped shell surface and is mounted rotatably in the housing, wherein the at least one first valve element comprises several openings limited by the shell surface, which openings can be selectively connected with one or several of the cooling fluid connections of the housing by rotation of the at least one first valve element,
    wherein at least one second valve element is provided which is rotatable in the housing relative to the at least one first valve element, wherein the at least one second valve element can selectively close or open one or several of the cooling fluid connections of the housing through rotation, and wherein a rotational drive is provided, with which the at least one first valve element and/or the at least one second valve element can be driven rotatably, and
    wherein the at least one second valve element is arranged rotatably mounted in the housing beside the at least one first valve element, wherein the at least one first and the at least one second valve element in each case have an axial opening on their sides facing towards each other, wherein the axial openings communicate with one another.

8. Thermostat valve according to claim 7, wherein the at least one second valve element is also a hollow valve element which has a spherical or a spherical-segment shaped outer surface wherein the at least one second valve element comprises at least one opening delimited by the outer surface, which opening can be selectively connected with at least one of the cooling fluid connections of the housing by rotation of the at least one second valve element.

9. Thermostat valve according to claim 8, wherein the axes of at least two of the cooling fluid connections lie in parallel distanced planes, seen in the axial direction of the rotation axes of the at least one first valve element and the at least one second valve element.

10. Thermostat valve for a combustion engine, comprising a housing, which comprises several cooling fluid connections and comprising at least one first hollow valve element, which has a spherical or spherical-segment shaped shell surface and is mounted rotatably in the housing, wherein the at least one first valve element comprises several openings limited by the shell surface, which openings can be selectively connected with one or several of the cooling fluid connections of the housing by rotation of the at least one first valve element,
    wherein at least one second valve element is provided which is rotatable in the housing relative to the at least one first valve element, wherein the at least one second valve element can selectively close or open one or several of the cooling fluid connections of the housing through rotation, and wherein a rotational drive is provided, with which the at least one first valve element and/or the at least one second valve element can be driven rotatably, and
    wherein the at least one second valve element is rotatable between two stops in one of the openings delimited by the shell surface of the at least one first valve element.

11. Thermostat valve according to claim 10, wherein at least one outer surface of the at least one second valve element forms a variable section of the shell surface of the at least one first valve element.

12. Thermostat valve for a combustion engine, comprising a housing, which comprises several cooling fluid connections and comprising at least one first hollow valve element, which has a spherical or spherical-segment shaped shell surface and is mounted rotatably in the housing, wherein the at least one first valve element comprises several openings limited by the shell surface, which openings can be selectively connected with one or several of the cooling fluid connections of the housing by rotation of the at least one first valve element,
    wherein at least one second valve element is provided which is rotatable in the housing relative to the at least one first valve element, wherein the at least one second valve element can selectively close or open one or several of the cooling fluid connections of the housing through rotation, and wherein a rotational drive is provided, with which the at least one first valve element and/or the at least one second valve element can be driven rotatably,
    wherein holding means are provided, which exert a holding force holding the at least one second valve element and/or the at least one first valve element in a predefined rotational position, and
    wherein the holding means comprise sealing means which are provided in the area of at least one cooling fluid connections of the housing closable by the at least one second valve element and/or the at least one first valve element, wherein the sealing means, when the at least one second valve element and/or the at least one first valve element close this cooling fluid connection, exert a contact force onto an outer surface of the at least one second valve element and/or the at least one first valve element such, that the at least one second valve element and/or the at least one first valve element are held in the predefined rotational position until it is moved out of contact with the sealing means through a rotational movement of the respective other of at least one first valve element and/or at least one second valve element.

13. Thermostat valve according to claim 12, wherein the at least one second valve element and/or the at least one first valve element can be rotated out of the predefined rotational position against the holding force of the holding means through a rotational movement of the respective other of at least one first valve element and/or at least one second valve element.

14. Thermostat valve according to claim 13, wherein the holding means comprise spring bias means, which exert the holding force for holding the at least one second valve element and/or the at least one first valve element in the predefined rotational position.

15. Thermostat valve according to claim 12, wherein the sealing means comprise at least one slide ring adjusted to the shell surface of the at least one first valve element and/or the outer surface of the at least one second valve element and at least one elastic sealing ring which biases the slide ring against the shell surface of the at least one first valve element and/or against the outer surface of the at least one second valve element.

* * * * *